(12) United States Patent
Lawrence et al.

(10) Patent No.: US 6,250,066 B1
(45) Date of Patent: Jun. 26, 2001

(54) COMBUSTOR WITH DILUTION BYPASS SYSTEM AND VENTURI JET DEFLECTOR

(75) Inventors: Kyle Lawrence, Chandler; James E. Lenertz, Scottsdale, both of AZ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/505,235

(22) Filed: Feb. 16, 2000

Related U.S. Application Data

(63) Continuation-in-part of application No. 08/966,393, filed on Nov. 7, 1997, now Pat. No. 6,070,406.
(60) Provisional application No. 60/031,780, filed on Nov. 26, 1996.

(51) Int. Cl.$^7$ ........................................... F23R 3/26
(52) U.S. Cl. ............................................. 60/39.23; 60/737
(58) Field of Search .................... 60/39.23, 737, 60/738

(56) References Cited

U.S. PATENT DOCUMENTS

| | | |
|---|---|---|
| 2,552,851 | 5/1951 | Gist, Jr. . |
| 2,620,626 * | 12/1952 | Lysholm ............................. 60/39.2 |
| 2,628,475 | 2/1953 | Heath . |
| 3,531,937 | 10/1970 | Sneeden . |
| 3,633,361 | 1/1972 | Bauger et al. . |
| 3,739,576 * | 6/1973 | Chamberlain ....................... 60/39.36 |
| 3,851,466 | 12/1974 | Verdouw . |
| 4,193,260 | 3/1980 | Carlise et al. . |
| 4,215,535 * | 8/1980 | Lewis .................................... 60/736 |
| 4,356,698 * | 11/1982 | Chamberlain ......................... 60/733 |
| 5,377,483 | 1/1995 | Mowill . |
| 5,628,182 * | 5/1997 | Mowill ................................... 60/737 |
| 5,638,674 | 6/1997 | Mowill . |
| 5,669,218 | 9/1997 | Greninger . |
| 5,685,156 | 11/1997 | Willis et al. . |
| 5,797,267 | 8/1998 | Richards . |

OTHER PUBLICATIONS

Publication: Development of a Dry Low Emission Combustor for the AS1042 Industrial Gas Turbine Engine, P. Samuel and J.E. Lenertz; D.B. Bain and R.J. Mowill (06/97).

* cited by examiner

*Primary Examiner*—Louis J. Casaregola
(74) *Attorney, Agent, or Firm*—Robert Desmond, Esq.

(57) ABSTRACT

Disclosed is a premix injector for mixing air and fuel and injecting the mixture into a combustion chamber. The premix injector includes an air blast fuel nozzle, a venturi, and a premix chamber. The venturi extends from an inlet to an exit which is in fluid communication with a combustion chamber. Importantly, the venturi has a jet deflector along its interior wall near its exit and on the side of the venturi nearest the exit of the combustor.

18 Claims, 8 Drawing Sheets

COMBUSTOR WITH DILUTION BYPASS SYSTEM AND VENTURI JET DEFLECTOR

REFERENCE TO COPENDING APPLICATION

This application is a continuation-in-part of U.S. patent application Ser. No. 08/966,393, filed Nov. 7, 1997 (U.S. Pat. No. 6,070,406) which claims benefit of 60/031,780 filed Nov. 26, 1996.

TECHNICAL FIELD

This invention relates generally to low NOx combustion systems for a gas turbine engine. More particularly, the present invention relates to a venturi for mixing fuel and air and injecting the mixture into a combustion chamber of such a system.

BACKGROUND OF THE INVENTION

Gas turbine engines of the type used for industrial applications may employ combustor systems designed to minimize nitrogen oxide emissions. One such combustor system, disclosed in U.S. Pat. No. 5,481,866, entitled Single Stage Premixed Constant Fuel/Air Ratio Combustor, issued to Mowill on Jan. 9, 1996, is incorporated herein by reference to the extent necessary for a full understanding of such a combustor. The '866 patent discloses a combustor having an externally cooled non-perforated combustor liner that receives all combustion air from a venturi shaped premixer. Excess air that does not enter the combustor through the premixer is ducted so as to externally cool the combustor liner, and eventually re-enters the flowpath downstream of the combustion region through dilution ports. An air valve is used to directly control the amount of air supplied to the premixer so as to minimize nitrous oxide emissions at all power settings. The air valve has the effect of indirectly controlling the amount of air routed to the dilution ports.

A problem occurs when combustors of the type disclosed in the '866 patent are used in conjunction with an engine having a compressor with a relatively high compression ratio. At low engine power settings, the valve used to control air to the premixer is mostly closed forcing most of the compressed air through the dilution ports. Although engine power is reduced, the total volume of air being pumped by the compressor at low power or idle settings remains high, resulting in a substantial increase in dilution airflow at reduced power. However, the dilution ports are necessarily sized to provide adequate backflow margin at the lower flow, higher power settings. Thus at reduced power, higher dilution flow conditions, the dilution ports overly restrict the dilution airflow causing a larger than desired pressure drop across the combustor and a loss of engine efficiency.

One solution has been to provide a separate apparatus for varying the flow area of the dilution ports at different power settings in addition to a valve for controlling air to the premixer. A disadvantage is that such apparatus are typically very complex, adding significantly to the total cost of the combustor system.

Another solution is disclosed in the copending U.S. patent application Ser. No. 08/966,393, filed Nov. 7, 1997. This application discloses a combustor dilution bypass system that includes a valve and a low pressure drop combustor bypass duct. The valve simultaneously controls both the supply of air to the premixer, and the amount of air directed into a large bypass duct. Air entering the bypass duct is reintroduced into the gas flowpath as dilution air downstream of the primary combustion zone. At low power settings the valve directs most of the air to the bypass duct, in effect adding dilution flow to that provided through the fixed area dilution ports, whereby the pressure drop across the combustor may be controlled at an optimal level. This combustor dilution bypass system is illustrated in FIGS. 1–11 of this application.

Referring to FIGS. 1 and 3 there are two premix injectors 64 on each side of the combustor spaced about 180° apart. Each premix injector 64 injects tangentially a mixture of fuel and air into the combustion chamber 60. FIG. 12 shows the results from testing of this combustor and reveals two spikes in carbon monoxide generation as a function of angular distance around the combustion chamber 60. These spikes occurred just downstream of the venturis 70 and indicate areas of unburned fuel. This unburned fuel is believed to be caused by some of the mixture exiting the venturis flowing directly to the dilution zone 36 instead of being mixed and combusted in the combustion chamber. To see how this could happen, viewing FIG. 2, the fuel air mixture flowing from the premixer injectors 64 enters the combustion chamber tangentially and sprays outward upon entering the combustion chamber. Therefore some the mixture flows directly to the dilution zone 36 located at the exit of the combustor and does not mix in with the gas in the combustion chamber.

Accordingly, a need exists in a venturi to be used in these premixer injectors that would direct the flow of gas away from the combustor exit.

SUMMARY OF THE INVENTION

In view of the above it is the object of the present invention to provide a venturi that directs the flow of gas away from the combustor exit.

Another object of the present inventions is to combine this venturi in a combustor system designed for low nitrous oxide emissions for a simplified method of reintroducing excess air not used for combustion, back into the flowpath downstream of the combustion zone without the complexity and expense associated with variable area dilution ports.

The present invention achieves these objects by providing a valve and a low pressure drop combustor bypass duct. The valve simultaneously controls both the supply of air to the premixer, and the amount of air directed into a large bypass duct. Air entering the bypass duct is reintroduced into the gas flowpath as dilution air downstream of the primary combustion zone. At low power settings the valve directs most of the air to the bypass duct, in effect adding dilution flow to that provided through the fixed area dilution ports, whereby the pressure drop across the combustor may be controlled at an optimal level.

The premixer includes a premix injector in which air and fuel are mixed. The premix injector includes an air blast fuel nozzle, a venturi, and a premix chamber. The venturi extends from an inlet to an exit which is in fluid communication with a combustion chamber. Importantly, the venturi has a jet deflector along its interior wall near its exit and on the side of the venturi nearest the exit of the combustor.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Figure 1:
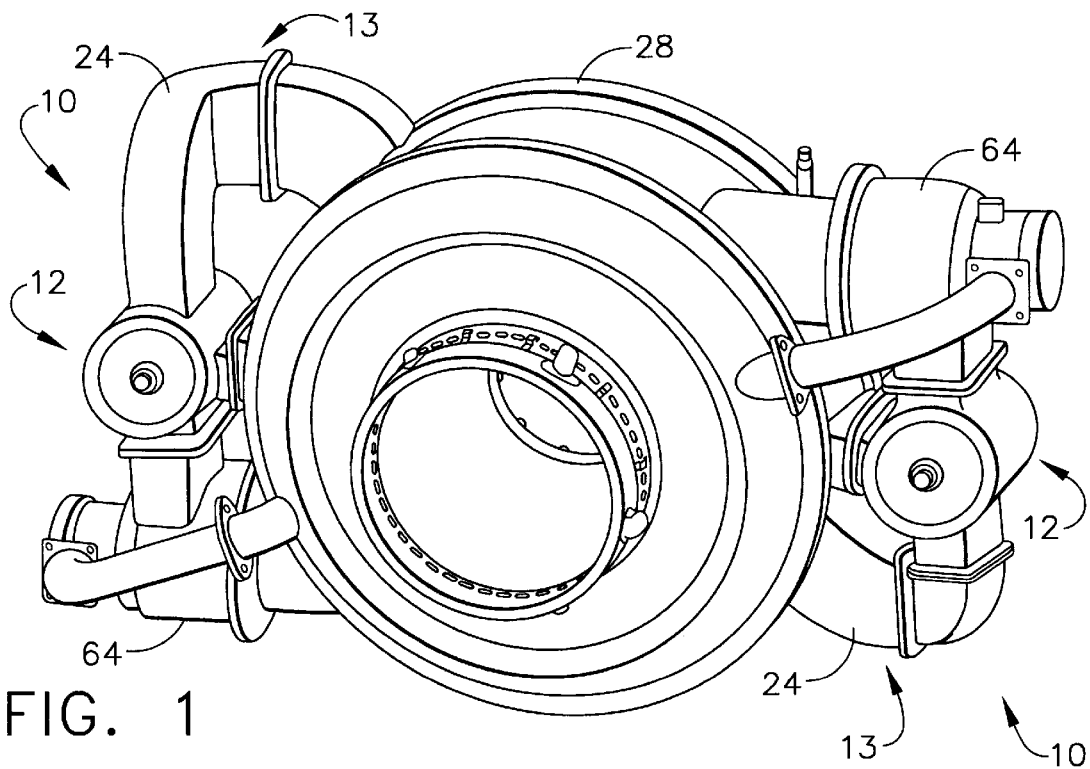
FIG. 1 depicts a perspective view of a low emissions combustor with two dilution bypass systems of the type contemplated by the present invention.

Referring to FIG. 1 the bypass system of the subject invention is indicated generally by the numeral 10. The bypass system 10 includes a valve 12 connected to a combustor bypass 13. In the preferred embodiment, two bypass systems 10 are used, one on each side of the combustor and spaced about 180 degrees apart. A different number or arrangement of bypass systems than what is shown here may be preferable depending on the particular engine and application.

Figure 2:
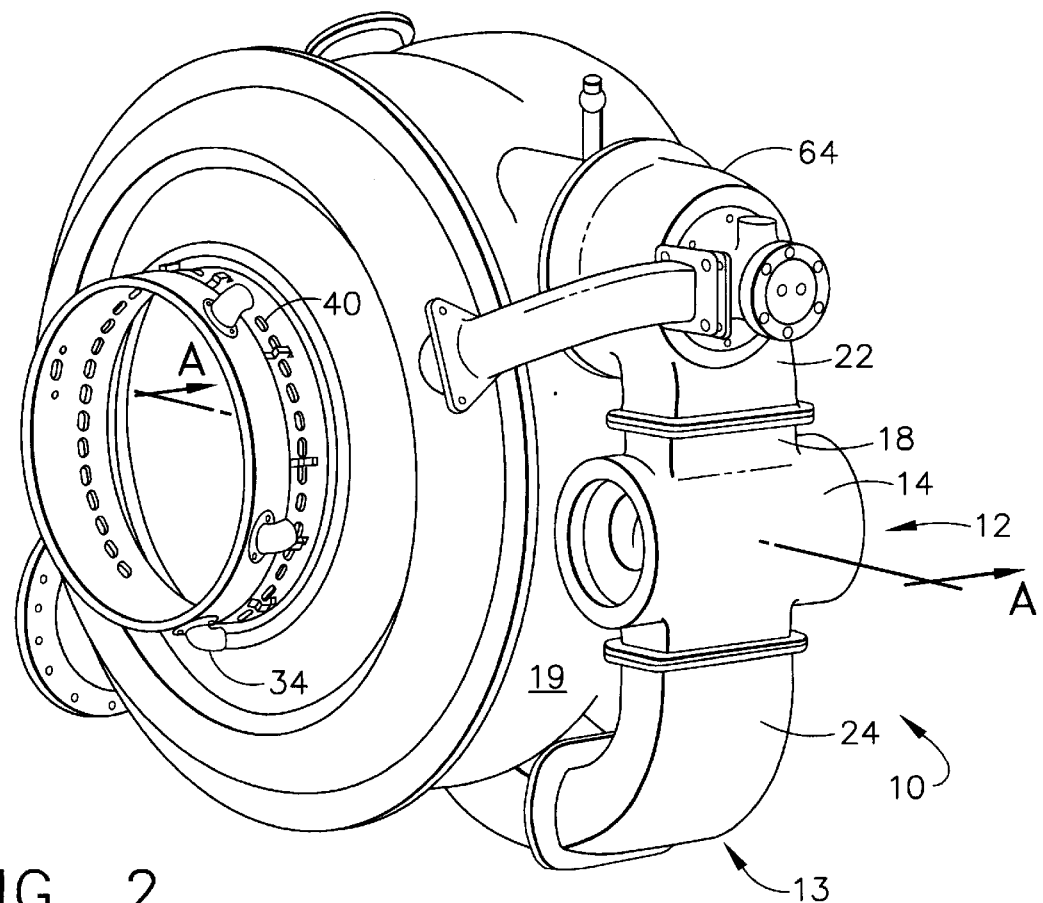
FIG. 2 depicts the combustor of FIG. 1 from a different perspective.
Figure 3:
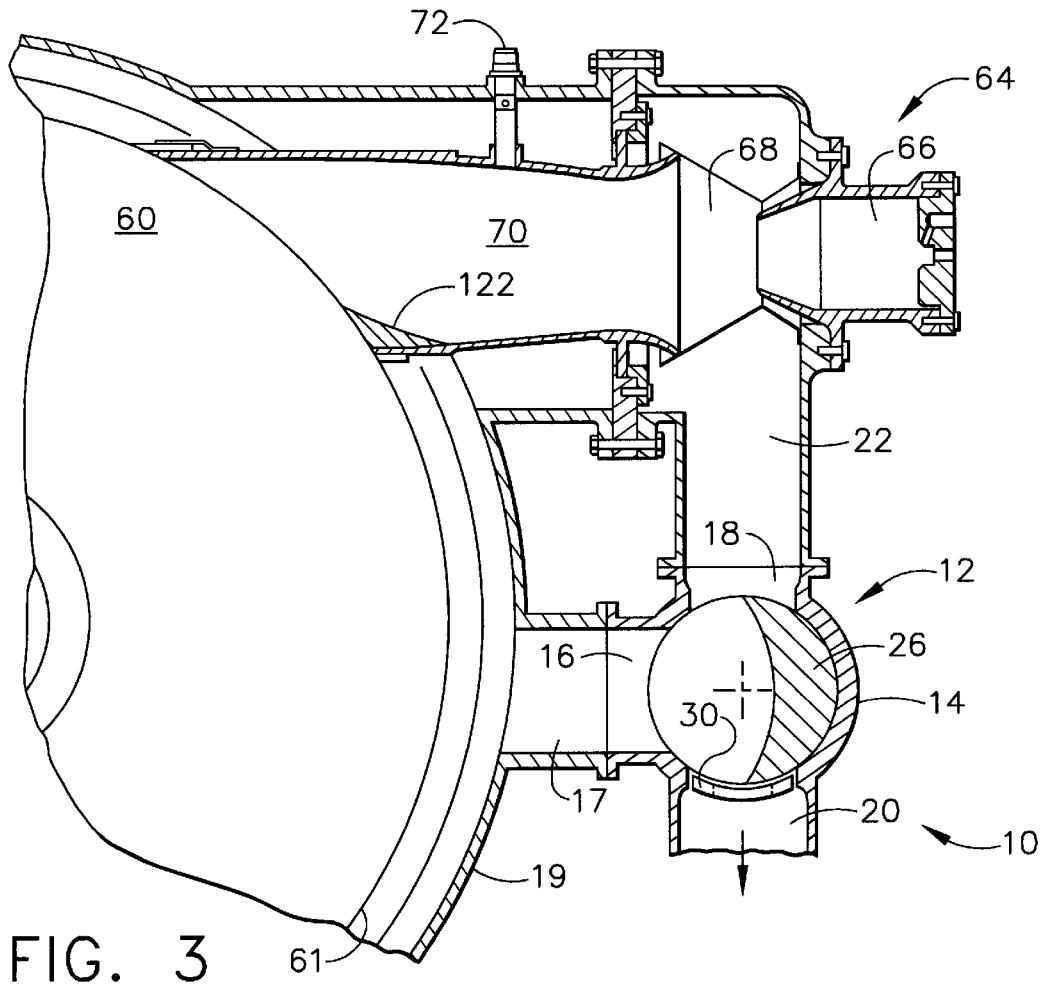
FIG. 3 depicts a sectional view through the combustor and one of the dilution bypass system of FIG. 2 along line A—A.
Figure 4:
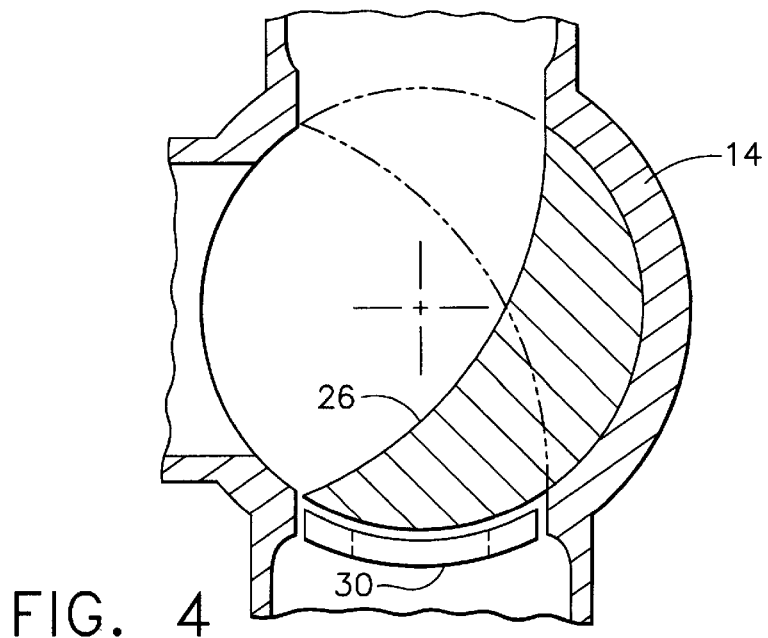
FIG. 4 depicts an enlarged fragmentary sectional view of a portion of FIG. 3.
Figure 5:
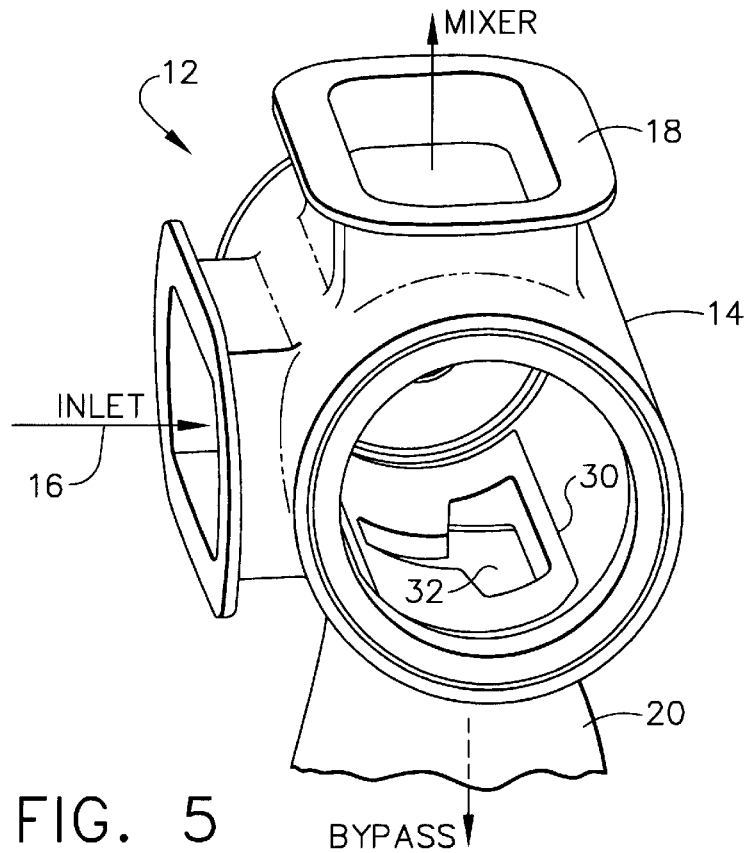
FIG. 5 depicts a perspective view of the valve contemplated by the present invention.

Referring to FIGS. 2 through 4, the valve 12 comprises a cylindrical housing 14 defining an inlet port 16, and two exit ports 18 and 20. Inlet port 16 is connected to an inlet duct 17 for receiving compressed air from the combustor plenum 19 that circumscribes the combustion chamber 60 which is defined by a combustor wall 61. Exit port 18 connects to the premixer duct 22 which leads to the premixer injector 64 that injects tangentially a mixture of fuel and air into the combustion chamber 60. The injector 64 has an air blast fuel nozzle 66, a venturi 70, a premix chamber 68 and an igniter 72. In operation, the air blast nozzle inject a fuel-air mixture into the premix chamber 68. In the premix chamber additional air is added through premixer duct 22. To keep the nitrous oxide as low as possible the fuel air mixture exiting the venturi is as fuel lean as possible. The igniter 72 ignites this lean mixture during engine starting creating a hot gas that flows into the combustion chamber 60. Exit port 20 connects to the bypass duct 24. The valve 12 includes a crescent shaped rotatable valve rotor 26 for selectively controlling the relative proportions of airflow to premixer duct 22 and bypass duct 24.

This flow distributing or dividing function of the valve can be best visualized by referring to FIGS. 3 and 4. As shown in FIG. 4, when valve rotor 26 is in the idle position, (broken line), most of the airflow is directed to bypass duct 24, and very little is directed to the premixer duct 22. Conversely, at maximum power condition, (solid line), most of the airflow is directed to the premixer duct 22, and very little to the bypass duct 24. FIG. 3 depicts an intermediate power setting wherein the valve plate 26 is positioned to evenly divide the flow between the premixer duct and bypass duct. As evident from the drawings, the crescent shape of the rotatable valve rotor 26 provides for a smooth and efficient air flowpath from inlet port 16 to either of the exit ports 18 or 20, particularly at idle and max power conditions.

Figure 6:
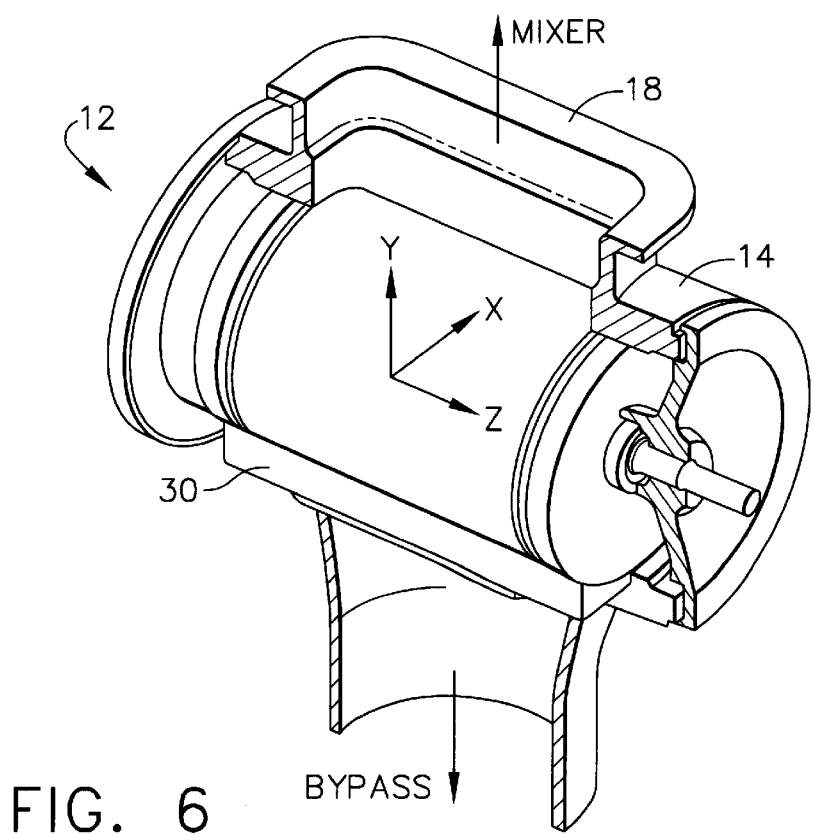
FIG. 6 depicts a partial cut-away perspective view of the valve contemplated by the present invention.
Figure 7:
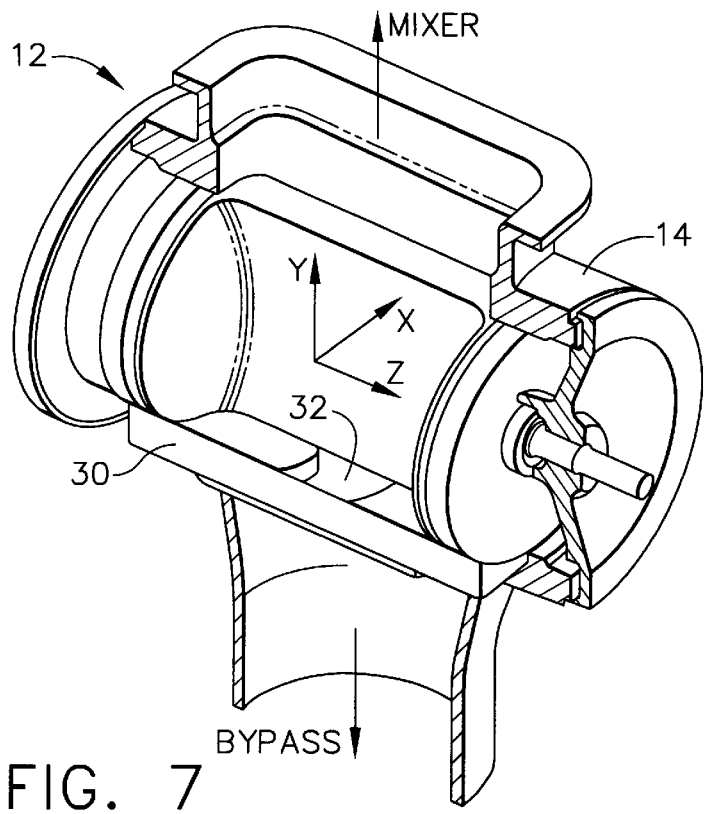
FIG. 7 depicts another partial cut-away perspective view of the valve contemplated by the present invention.
Figure 8:
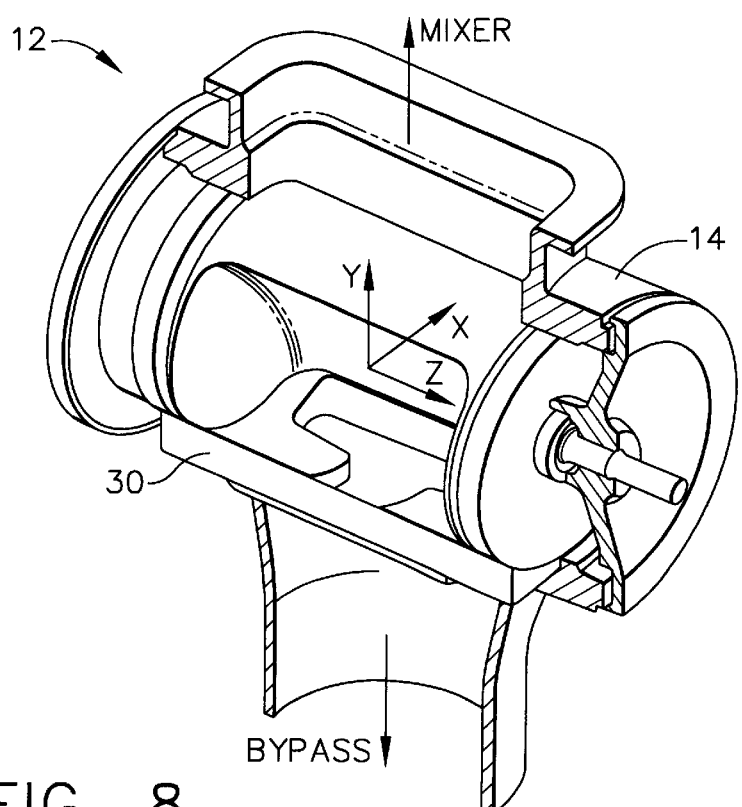
FIG. 8 depicts a third partial cut-away perspective view of the valve contemplated by the present invention.

Referring now to FIGS. 5–8, valve 12 further comprises an exchangeable bypass orifice plate 30 replaceably mounted in the exit port 20. To maintain a constant pressure drop across the combustor and to assure that the right amount of air flows to the premixer injector 64 requires controlling or scheduling the ratio of air supplied to the premixer duct 22 and to the bypass duct 24. The bypass orifice plate 30 includes a variable width orifice 32 for this purpose. By shaping the orifice 32, the ratio of the flow areas of the bypass port to the premixer port can be controlled, and thereby control the ratio of air supplied to each. FIGS. 6 through 8 show valve rotor 26 exposing Orifice plate 30 to varying degrees for three power settings. FIG. 6 shows the maximum power condition where the orifice plate is covered. FIG. 7 shows a fifty percent power condition where the orifice plate is approximately half opened. Finally, FIG. 8 shows the shut down power condition where the orifice plate is fully opened and there is no flow to the premixer injector 64. The shape and dimensions of the orifice plate 32 are selected, in a manner familiar to those skilled in the art, for the particular engine design or installation, or desired pressure drop changes at low power conditions.

Figure 9:
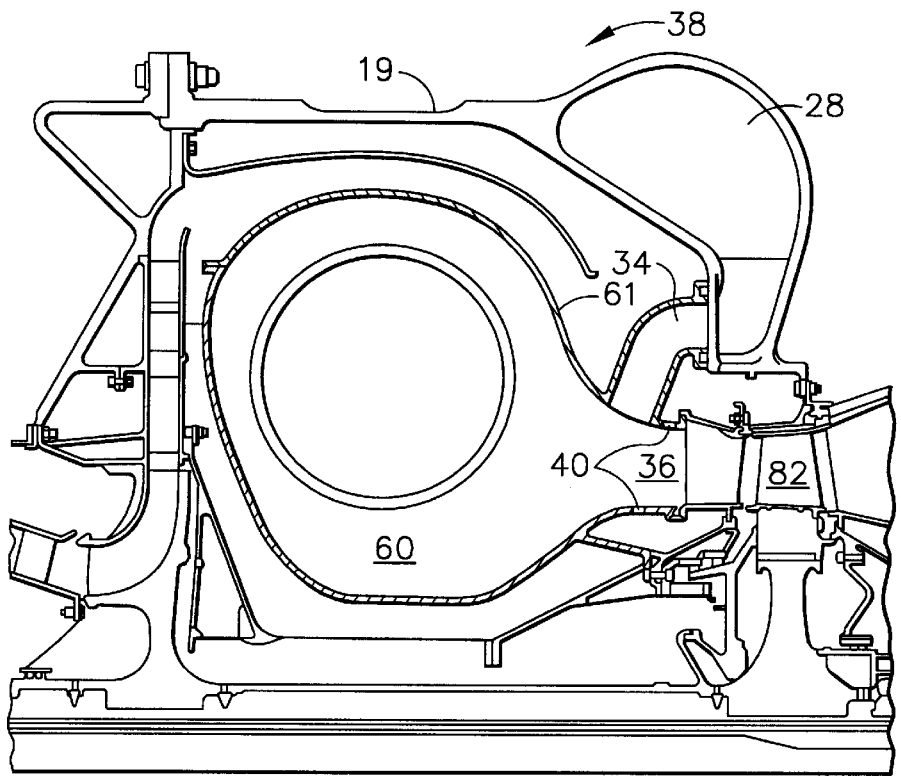
FIG. 9 depicts a transverse sectional view of the combustor of FIG. 1.
Figure 10:
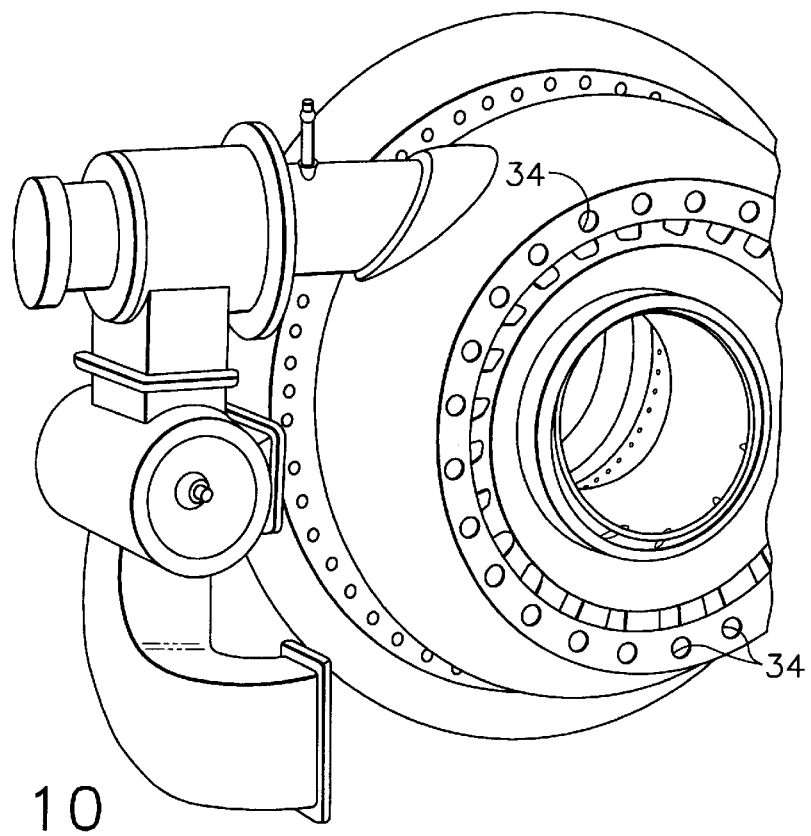
FIG. 10 depicts a perspective view of a portion of the combustor and dilution bypass system.

Referring to FIG. 9, compressed air from compressor 70 enters the combustor plenum 19. As previously described a portion of this air flows from the plenum 19 through the bypass 13. The bypass 13 further includes an annular bypass manifold 28 which receives air from bypass ducts 24. A plurality of tubes 34 extend from and connect bypass manifold 28 to the dilution zone 36 of combustor chamber 60. Together, the valve 12, bypass ducts 24, bypass manifold 28, and tubes 34 provide a clear flowpath with minimal pressure drop for routing compressed air directly from the compressor exit to the dilution zone 36 in generally the same location has the dilution ports 40 at the exit of the combustor just upstream of a turbine 82. Independent of the bypassed air, the dilution ports 40 also receive air from plenum 19.

Figure 11:
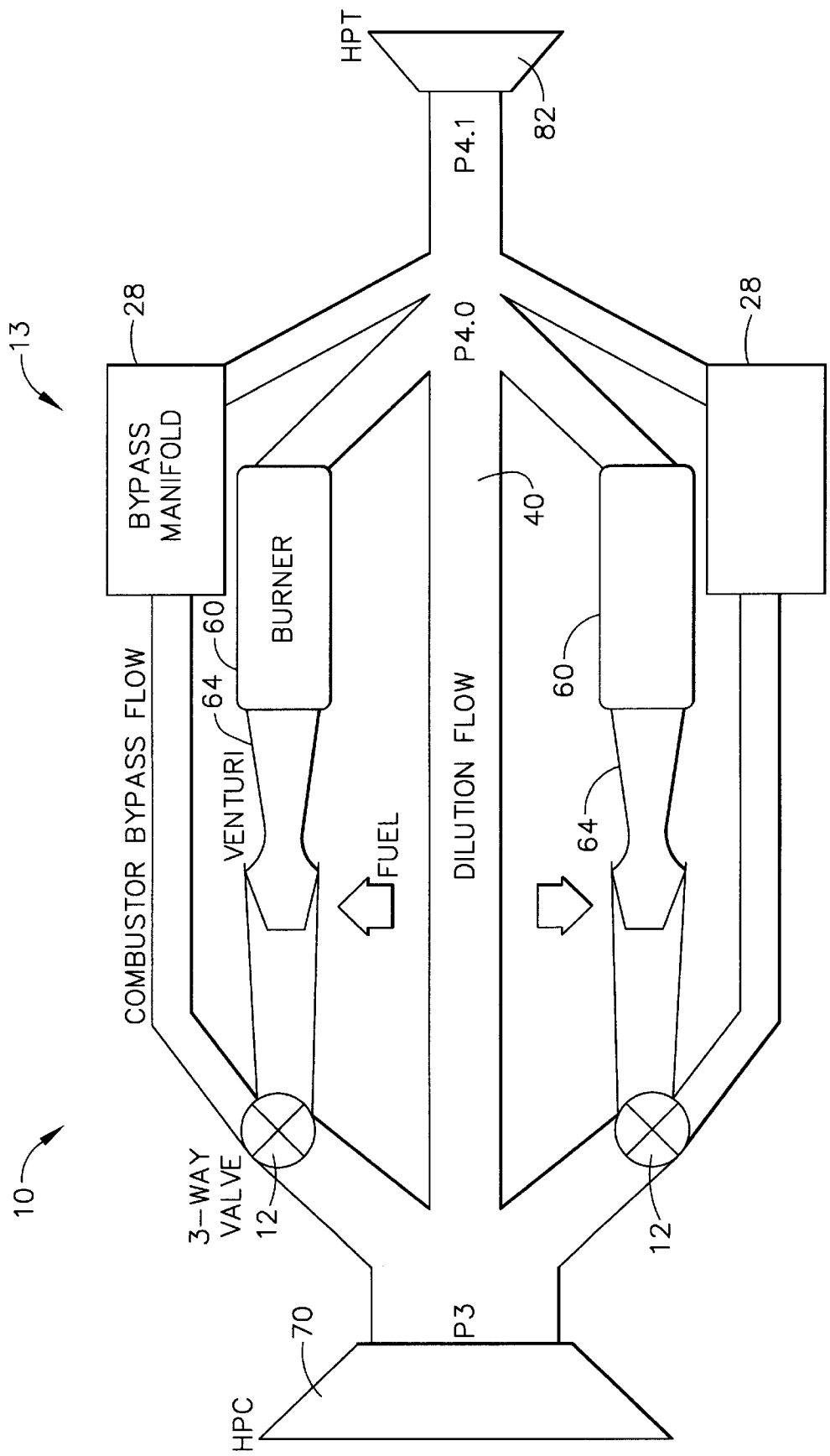
FIG. 11 depicts a schematic view of the combustor dilution bypass system.
Figure 12:
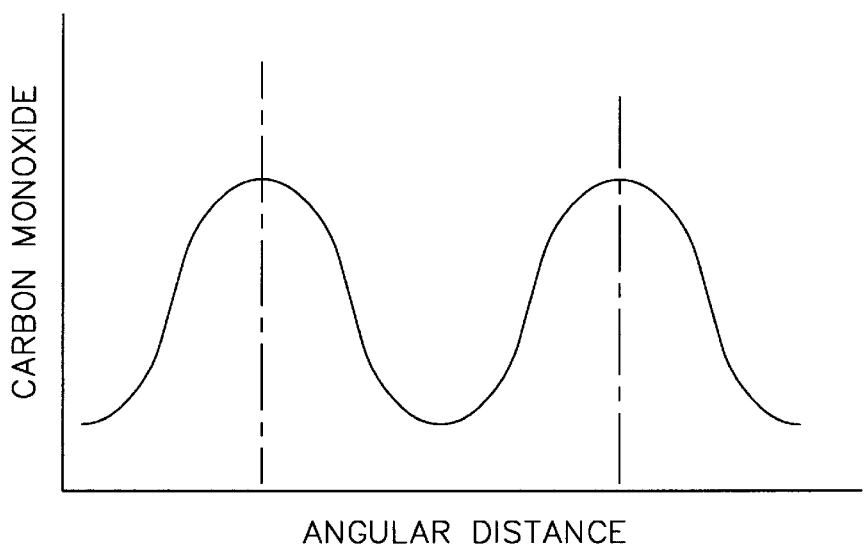
FIG. 12 depicts test data showing CO generation as a function of angular distance around the combustion chamber contemplated by the present invention.

FIG. 11 shows schematically how the two bypass systems 10 operate. At maximum power condition, the path to the bypass 13 is closed off, forcing most of the air to the premixer injector 64 and through the combustor chamber 60. Any excess air is then indirectly caused to reenter the gas flowpath through the dilution ports 40 surrounding the dilution zone 36. Dilution ports 40 are sized for providing efficient flow at this maximum power setting, and so as to produce the desired pressure drop across the combustor. In this condition, the bypass is essentially not utilized.

As power is decreased from maximum, valve 12 is rotated closing off the port 18 leading to the premixer injector. Although engine power is substantially reduced at the idle condition, the total airflow volume being pumped by the compressor is not. Thus at idle power, the volume of excess air, i.e. air not going to the premixer injector increases dramatically. Were it not for the bypass 13, all of the excess air would be directed through the dilution ports 40 resulting in a larger than desired pressure drop across the combustor.

However by simultaneously opening the alternate path through the bypass duct, the three way valve allows for the large flow of low power excess air to reach the dilution zone 36 without having to flow through the overly restrictive dilution pods. Rather, the flow is divided, with an appropriate amount flowing through dilution ports 40, and the majority of the excess air flowing through the bypass. Through use of the bypass orifice plate 30, the proper distribution of bypass air, to air through ports 40 can be achieved such that the combustor pressure drop is maintained constant for all operating conditions or can be adjusted as desired at low power settings.

Figure 13:
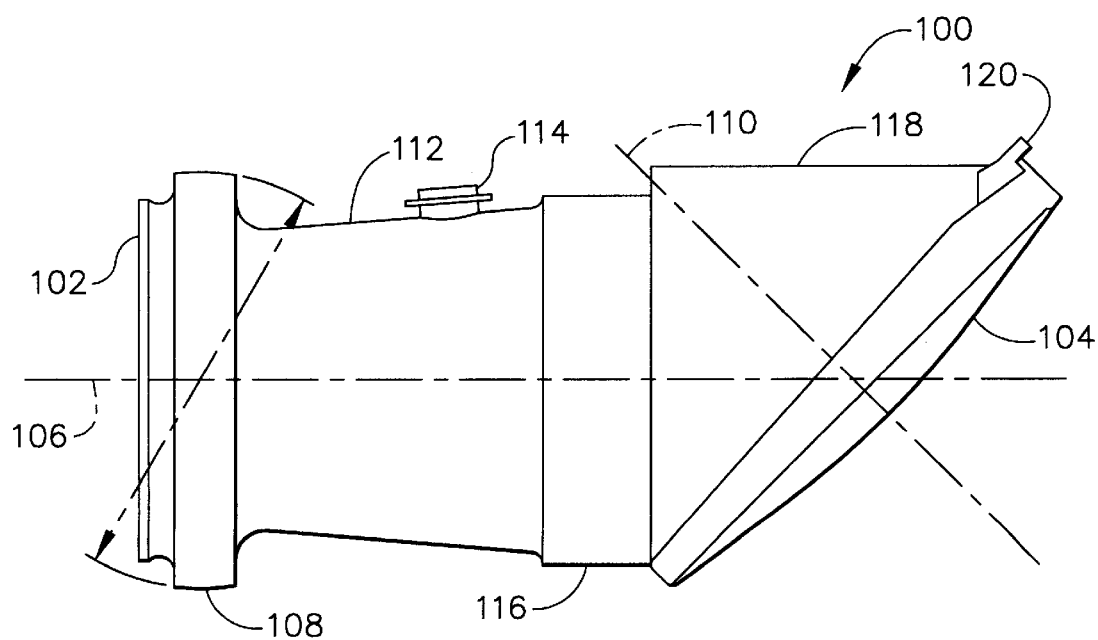
FIG. 13 shows a side view of the venturi contemplated by the present invention.
Figure 14:
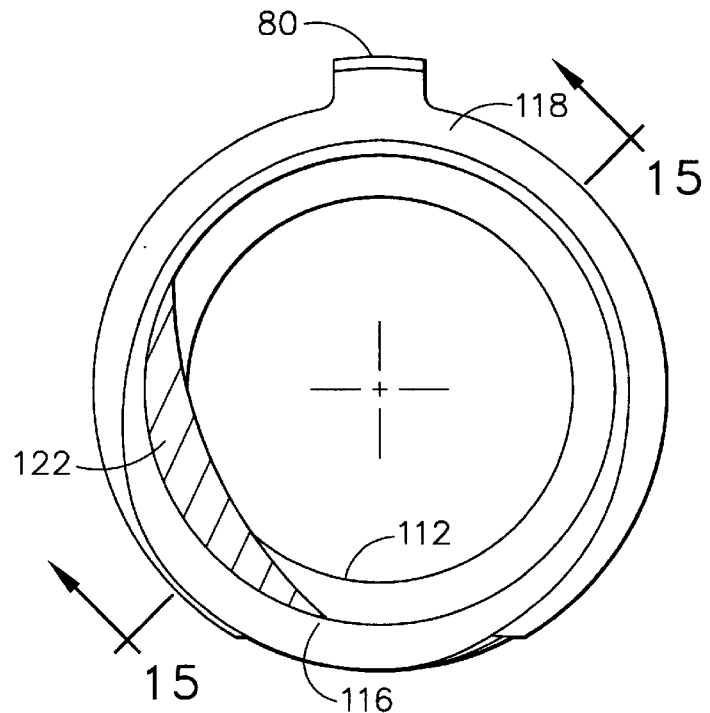
FIG. 14 shows a front view of the venturi contemplated by the present invention.
Figure 15:
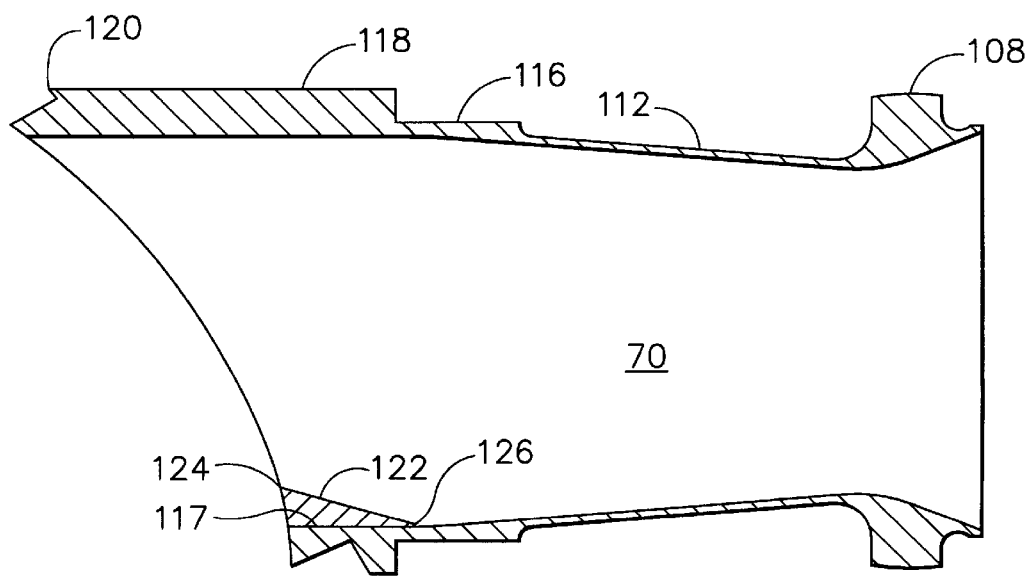
FIG. 15 shows a view taken along line 15—15 of FIG. 14.

Referring to FIGS. 13–15, the venturi 70 is comprised of a tube 100 extending from an inlet 102 to an exit 104. The inlet 102 is symmetric about an axis 106 and has an outer surface 108 raised and rounded about the perimeter of the inlet 102. The exit 104 is symmetric about an axis 110 that is at an angle relative to axis 106 so that the exit 104 can mate to the spherical surface of the combustion chamber 60. Between the inlet 102 and exit 104 are a tapered section 112 having a boss 114 for receiving the igniter 72, a first cylindrical portion 116 and a second cylindrical portion 118. A rocker tab 120 is formed on the exterior surface of the cylindrical portion 118 and is used in mounting the venturi to the combustion chamber 60. On the inside of the second cylindrical portion 116 is a jet deflector 122. The jet deflector 122 extends inward from an interior surface 117 of the first cylindrical portion 116 and is located as close to the exit 104 as possible. The jet deflector is tapered so that one end 124 extends into the flow stream in the venturi 70 and the other end 126 is flush with the interior surface 117. Referring to FIG. 14 the jet deflector extends circumferentially around the interior surface 117 an angular distance in the range of 60 to 100 degrees.

As the fuel air mixture exits the venturi 70, that part of the flow on the side of the venturi nearest the combustor exit comes in contact with the jet deflector 122 and is redirected towards the combustor inlet where it is more completely combusted.

Various modifications and alterations of the above described sealing apparatus will be apparent to those skilled in the art. Accordingly, the foregoing detailed description of the preferred embodiment of the invention should be considered exemplary in nature and not as limiting to the scope and spirit of the invention.

What is claimed is:

1. A gas turbine engine comprising:
 a compressor providing pressurized air;
 a turbine for expanding a hot gas;
 a combustor disposed between said compressor and said turbine; said combustor comprising;
 a combustion chamber defined by a combustor wall;
 a plenum circumscribing said combustor wall and receiving said pressurized air from said compressor;
 a premix injector in fluid communication with said plenum and a source of fuel whereby the air and fuel are mixed, said premixer injector including an air blast fuel nozzle, a venturi, and a premix chamber, said venturi extending from an inlet to an exit in fluid communication with the combustion chamber, said venturi having a jet deflector along its interior wall near its exit; and
 an igniter for igniting said fuel and air mixture to initiate the formation of said hot gas.

2. The gas turbine engine of claim 1 wherein said jet deflector is located on the side of the venturi nearest the exit of said combustion chamber.

3. The gas turbine engine of claim 2 wherein said jet deflector extends circumferentially an angular distance in the range of 60 to 100 degrees.

4. The gas turbine engine of claim 1 further comprising a dilution zone just upstream of said turbine, said dilution zone receiving a portion of the air in said plenum through at least one dilution hole; and a bypass system for controlling the flow of the remaining portion of said air in said plenum to said injector and said dilution zone.

5. The gas turbine engine of claim 4 wherein said bypass system includes:
 a first conduit extending from said plenum;
 a second conduit in fluid communication with said first conduit and said injector;
 a third conduit in fluid communication with said first conduit and said dilution zone; and
 a valve disposed between said first, second, and third conduits for directing the flow of air from said plenum to said premixer nozzle and said dilution zone.

6. The gas turbine of claim 5 wherein said valve comprises:
 a housing having a first port connected to said first conduit,
 a second port connected to said second conduit and a third port connected to said third conduit; and
 a valve rotor rotatably mounted to said housing.

7. The gas turbine of claim 6 wherein said valve rotor is crescent shaped.

8. The gas turbine engine of claim 6 wherein said valve includes an exchangeable orifice plate mounted in said third port.

9. The gas turbine engine of claim 5 further comprising an annular bypass manifold in fluid communication with said third conduit and a plurality of tubes extending from said bypass manifold to said dilution zone.

10. A combustion system with a controllable pressure drop thereacross, comprising:
 a combustion chamber defined by a combustor wall and having an inlet and an exit;
 a plenum circumferentially disposed about said combustor wall and receiving pressurized air;
 a premix injector in fluid communication with said plenum and a source of fuel whereby the air and fuel are mixed, said premixer injector including an air blast fuel nozzle, a venturi, and a premix chamber, said venturi extending from an inlet to an exit in fluid communication with the combustion chamber, said venturi having a jet deflector along its interior wall near its exit; and
 an igniter for igniting said fuel and air mixture to initiate the formation of a hot gas.

11. The combustion system of claim 10 wherein said jet deflector is located on the side of the venturi nearest the exit of said combustion chamber.

12. The combustion system of claim 11 wherein said jet deflector extends circumferentially an angular distance in the range of 60 to 100 degrees.

13. The combustion system of claim 10 further comprising a dilution zone just upstream of said exit, said dilution zone receiving a portion of the air in said plenum through at least one dilution hole in said combustor wall; and an adjustable bypass means for diverting to said dilution zone a portion of the air flowing from said plenum to said injector, whereby, the magnitude of the diverted air can be varied to obtain a desired pressure drop across said combustion system.

14. The combustion system of claim 13 wherein said bypass means includes a valve disposed between said plenum and said injector and said dilution zone.

15. The combustion system of claim 14 wherein said valve has a crescent shaped valve rotor.

16. The combustion system of claim 14 wherein said bypass means further includes:
- a first conduit extending between said plenum and said valve;
- a second conduit extending between said valve and said injector; and
- a third conduit extending from said valve to said dilution zone.

17. The combustion system of claim 16 further comprising an orifice disposed between said valve and said third conduit.

18. The combustion system of claim 17 further comprising an annular bypass manifold in fluid communication with said third conduit and a plurality of tubes extending from said bypass manifold to said dilution zone.

* * * * *